United States Patent
Kessler et al.

(10) Patent No.: US 11,731,468 B2
(45) Date of Patent: Aug. 22, 2023

(54) RADIO-TRANSMITTING SENSOR FOR A VEHICLE WHEEL, COMPRISING A DUAL-MODE ANTENNA CIRCUIT

(71) Applicants: Continental Automotive France, Toulouse (FR); Continental Automotive GmbH, Hannover (DE)

(72) Inventors: Sébastien Kessler, Toulouse (FR); Mohamed Cheikh, Toulouse (FR); Alexis Morin, Toulouse (FR); Frédéric Lathiere, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 405 days.

(21) Appl. No.: 17/257,935

(22) PCT Filed: Jul. 10, 2019

(86) PCT No.: PCT/EP2019/068506
§ 371 (c)(1),
(2) Date: Jan. 5, 2021

(87) PCT Pub. No.: WO2020/011840
PCT Pub. Date: Jan. 16, 2020

(65) Prior Publication Data
US 2021/0268850 A1 Sep. 2, 2021

(30) Foreign Application Priority Data
Jul. 12, 2018 (FR) .................................. 1856399

(51) Int. Cl.
*B60C 23/04* (2006.01)

(52) U.S. Cl.
CPC ...... *B60C 23/0454* (2013.01); *B60C 23/0452* (2013.01); *B60C 23/0488* (2013.01)

(58) Field of Classification Search
CPC ............ B60C 23/0408; B60C 23/0496; B60C 23/061; B60C 23/0494; B60C 23/0416;
(Continued)

(56) References Cited

U.S. PATENT DOCUMENTS 7,286,042 B2 * 10/2007 Perraud ............... B60C 23/0461
340/12.18
9,571,367 B2   9/2017 Kessler et al.
(Continued)

FOREIGN PATENT DOCUMENTS

CN      108227025 A      6/2018
DE   102019210920 A1 *  1/2021  ............. H01Q 23/00
(Continued)

OTHER PUBLICATIONS

Chinese Office Action for Chinese Application No. 201980046382. 2, dated Mar. 2, 2022 with translation, 9 pages.
(Continued)

*Primary Examiner* — Andre J Allen
(74) *Attorney, Agent, or Firm* — RatnerPrestia

(57) ABSTRACT

A radio-transmitting sensor for a vehicle wheel, suitable for measuring at least one physical quantity and for transmitting a radio signal representative of this measured physical quantity. The sensor includes a measurement and transmission circuit, an antenna impedance matching circuit, and an antenna circuit. The sensor includes a sensitivity switch controlled by the measurement and transmission circuit and suitable for switching the antenna circuit according to two modes: a dynamic mode in which the antenna circuit is configured as a magnetic antenna, and in which the sensor transmits said radio signal representative of the measured
(Continued)

physical quantity, this signal including transmitted data frames; and a static mode in which the antenna circuit is configured as an electric antenna.

11 Claims, 3 Drawing Sheets

(58) Field of Classification Search
CPC . B60C 23/0433; B60C 23/0493; B60C 19/00; B60C 23/04; B60C 23/041; B60C 23/0462; B60C 23/20; B60C 23/0411; B60C 23/0444; B60C 23/0479; B60C 11/24; B60C 23/064; B60C 23/007; B60C 23/062; B60C 23/0401; B60C 23/0413; B60C 23/0488; B60C 23/06; B60C 23/043; B60C 23/0452; B60C 11/246; B60C 23/0467; B60C 23/0498; B60C 23/02; B60C 99/006; B60C 23/0428; B60C 23/0442; B60C 23/009; B60C 2019/004; B60C 23/0425; B60C 11/243; B60C 23/004; B60C 23/00354; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/00; B60C 23/044; B60C 23/008; B60C 23/0455; B60C 23/0454; B60C 23/0483; B60C 23/0461; B60C 23/0474; B60C 23/0415; B60C 23/0491; B60C 23/0489; B60C 25/002; B60C 29/064; B60C 23/00363; B60C 23/0481; B60C 11/0318; B60C 23/0459; B60C 23/0471; B60C 2019/005; B60C 23/002; B60C 23/042; B60C 2200/02; B60C 23/0422; B60C 23/0423; B60C 23/0466; B60C 23/0477; B60C 13/001; B60C 23/0405; B60C 29/06; B60C 23/0437; B60C 23/0476; B60C 25/132; B60C 23/0447; B60C 23/0449; B60C 23/0427; B60C 25/00; B60C 9/18; B60C 23/0484; B60C 13/00; B60C 19/003; B60C 23/0486; B60C 23/065; B60C 23/00336; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 25/18; B60C 11/13; B60C 23/0418; B60C 23/0469; B60C 23/12; B60C 29/066; B60C 23/068; B60C 25/005; B60C 25/138; B60C 11/03; B60C 23/005; B60C 23/0432; B60C 25/007; B60C 3/00; B60C 5/14; B60C 99/00; B60C 11/11; B60C 17/04; B60C 17/06; B60C 23/063; B60C 23/10; B60C 25/0554; B60C 25/14; B60C 29/062; B60C 99/003; B60C 11/032; B60C 11/12; B60C 13/003; B60C 19/001; B60C 23/0435; B60C 23/126; B60C 23/127; B60C 23/16; B60C 29/068; B60C 3/04; B60C 9/20; B60C 11/01; B60C 11/0302; B60C 13/02; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/131; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/05221; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22
USPC .................................................. 73/146–146.8
See application file for complete search history.

(56) References Cited

U.S. PATENT DOCUMENTS

| | | | | |
|---|---|---|---|---|
| 2003/0156067 A1* | 8/2003 | Tenten | ................ | B60C 23/0433 343/711 |
| 2006/0139225 A1* | 6/2006 | Taguchi | .................. | H01Q 9/40 343/866 |
| 2007/0265798 A1* | 11/2007 | Katou | ................ | B60C 23/0433 702/140 |
| 2012/0302191 A1* | 11/2012 | Farrell | ................ | B60C 23/0444 455/272 |
| 2017/0001485 A1 | 1/2017 | Kessler et al. | | |
| 2018/0083344 A1* | 3/2018 | Han | ..................... | H01Q 13/106 |
| 2018/0162183 A1 | 6/2018 | Park et al. | | |
| 2019/0081615 A1* | 3/2019 | Edwards | .................. | H03J 5/00 |
| 2022/0417927 A1* | 12/2022 | Cho | .................... | B60C 23/0444 |

FOREIGN PATENT DOCUMENTS

| | | | | |
|---|---|---|---|---|
| EP | 2043054 | A1 | 4/2009 | |
| FR | 3018649 | A1 | 9/2015 | |
| GB | 2069209 | A * | 8/1981 | .......... B60C 23/007 |
| WO | 9420317 | A1 | 9/1994 | |
| WO | 9929525 | A1 | 6/1999 | |
| WO | WO-2008132653 | A1 * | 11/2008 | .......... G01R 33/285 |
| WO | 2015135660 | A1 | 9/2015 | |

OTHER PUBLICATIONS

International Search Report and Written Opinion for International Application No. PCT/EP2019/068506, dated Sep. 26, 2019, 8 pages.
International Search Report and Written Opinion for International Application No. PCT/EP2019/068506, dated Sep. 26, 2019, 13 pages (French).

* cited by examiner

RADIO-TRANSMITTING SENSOR FOR A VEHICLE WHEEL, COMPRISING A DUAL-MODE ANTENNA CIRCUIT

CROSS REFERENCE TO RELATED APPLICATIONS

This application is the U.S. National Phase Application of PCT International Application No. PCT/EP2019/068506, filed Jul. 10, 2019, which claims priority to French Patent Application No. 1856399, filed Jul. 12, 2018, the contents of such applications being incorporated by reference herein.

FIELD OF THE INVENTION

The invention relates to the field of electronic equipment for vehicles and more particularly targets a radio-transmitting sensor for a vehicle wheel, and a method for monitoring the rotation of a vehicle wheel.

BACKGROUND OF THE INVENTION

Radio-transmitting sensors for vehicle wheels are common devices, in particular in motor vehicles, which allow the driver of the vehicle to be informed about various parameters relating to the wheel, such as the pressure of the tire, or the temperature inside the tire. These sensors are generally attached inside the tire of each wheel, on the rim. These sensors measure one or more physical quantities, for example pressure and temperature, and transmit, to a central control unit located on board the vehicle, a radio signal representative of this measured physical quantity. The central control unit then communicates with the onboard electronic equipment in order to display the measured data to the driver and to display any alerts.

TPMS ("tire pressure monitoring system") devices are one example of devices that comprise such a radio-transmitting sensor housed in each wheel of a vehicle. Each of the TPMS sensors transmits data frames, which are trains of electromagnetic waves according to a determined protocol, specific to the TPMS, in order to communicate to a central control unit, fixed in the body of the vehicle, the value of the pressure of the tires.

The wheel radio-transmitting sensors include an electrical power source for supplying the power required to perform the radio transmissions. When designing such a wheel sensor, particular attention is paid to the sizing of these electrical power sources (cells or batteries, for example). The sensor is placed in the wheel and is therefore subjected to the centrifugal force created by the rotation of this wheel. The mass of the sensor is therefore a critical parameter and the electrical power source represents a substantial mass which should then be decreased to a minimum. The decreasing of the mass of the electrical power source is preferably combined with measures for limiting the electrical consumption of the wheel sensor in order to maintain an acceptable service life for the electrical power source.

Patent application FR3018649, incorporated herein by reference, describes such a radio-transmitting sensor for a vehicle wheel, comprising means, such as an accelerometer, that are capable of detecting the rotation of the wheel in which the sensor is mounted. By virtue of the possibility of detecting the rotation of the wheel, measures may be taken to limit or adapt the radio transmissions of the sensor in order to decrease its power consumption.

Other known solutions envisage the use, in the wheel sensors, of means for detecting the Earth's magnetic field in order to detect the rotation of the wheel and thus choose, for example, to limit radio transmissions when the vehicle is in parked phase in order to decrease the power consumption of the sensor.

A drawback of these solutions is that they require additional means, such as accelerometers or means for detecting the Earth's magnetic field, which have to be included in the wheel sensor and which increase its mass and its cost. Moreover, these solutions are generally unreliable because they implement electro-mechanical members or members sensitive to radiated magnetic noise, such as electrical distribution lines or low-frequency noise.

SUMMARY OF THE INVENTION

The aim of the invention is to improve the radio-transmitting sensors for vehicle wheels by providing such a sensor which, without requiring additional detection means, is suitable for monitoring the rotation of the wheel with a view to decreasing its electrical consumption.

To this end, an aspect of the invention targets a radio-transmitting sensor for a vehicle wheel, suitable for measuring at least one physical quantity and for transmitting a radio signal representative of this measured physical quantity, the sensor comprising a measurement and transmission circuit, an antenna impedance matching circuit, and an antenna circuit. The sensor comprises a sensitivity switch controlled by the measurement and transmission circuit and suitable for switching the antenna circuit according to two modes:

a dynamic mode in which the antenna circuit is configured as a magnetic antenna, and in which the sensor transmits said radio signal representative of the measured physical quantity, this signal comprising transmitted data frames; and a static mode in which the antenna circuit is configured as an electric antenna.

According to some preferred features, which can be combined:

the sensitivity switch is arranged between the antenna circuit and ground, the sensitivity switch being controlled such that:
in dynamic mode, the antenna circuit is connected to ground, the antenna circuit forming a magnetic antenna;
in static mode, the antenna circuit is isolated from ground, the antenna circuit forming an electric antenna;

the measurement and transmission circuit comprises a device for measuring the impedance of the antenna circuit.

A magnetic antenna, also called a "loop antenna", is an antenna forming a loop of one or more turns and which favors the magnetic component of the transmitted wave. This is the type of antenna conventionally used in the field of wheel sensors. These antennas are not very sensitive to interference.

An electric antenna is an antenna such as a dipole or monopole antenna which is formed by an electrical conductor extending vertically or horizontally and which favors the electrical component of the transmitted wave. It should be noted that electromagnetic disturbances are mainly conveyed by the electric field.

Another aspect of the invention is a method for monitoring the rotation of a vehicle wheel, implementing the sensor described above. This method comprises the following steps:

when the vehicle is in parked phase, transmitting, in static mode, only measurement frames and performing a measurement of the impedance of the antenna circuit on each transmission of a measurement frame;

comparing each impedance measurement with the previous one;

when at least two successive impedance measurements have a deviation greater than a predetermined threshold, controlling the sensitivity switch so that it switches to dynamic mode.

The static mode of the antenna circuit makes it possible to survey the dielectric parameters of the environment of the sensor and thus makes it possible to detect changes such as those caused by rotation of the wheel in which the sensor is mounted. The detection of such changes is based solely on the radio-transmitting means that the sensor already has for performing its main function, which is to transmit a radio signal representative of a measured physical quantity. No additional device is required to provide a detection function, for example for detecting the rotation of the wheel, which contributes to decreasing the mass and cost of the wheel sensor.

In addition, detections based on the surveying of the dielectric parameters of the environment of the sensor are performed more reliably than the known solutions because the static mode is sensitive to changes and is not affected by electromagnetic disturbances. The static mode may be used whenever the vehicle is in parked phase, without transmitting any (or minimal) data frames. The transmitting activity of the sensor is then highly reduced; it consists just in detecting the next transition of the vehicle to a driving phase. The dynamic mode may then be used when the vehicle is in driving phase or for any normal transmitting activity of the sensor. Transmissions of data frames are performed only in dynamic mode and are therefore protected from electromagnetic disturbances through the use of a magnetic antenna. Electrical consumption is therefore greatly decreased during prolonged phases at standstill, these phases allowing reliable surveying of the dielectric parameters of the environment and therefore reliable detection of a change such as wheel rotation.

The sensor according to an aspect of the invention may comprise the following additional features, alone or in combination:

when the antenna circuit is in static mode, the sensor transmits measurement frames, and the device for measuring the impedance of the antenna circuit performs a measurement the impedance of the antenna circuit on each measurement frame;

the sensor transmits one measurement frame in static mode between two data frames transmitted in dynamic mode;

the measurement and transmission circuit is suitable for switching the antenna circuit to dynamic mode when at least two successive measurements of the impedance of the antenna circuit have a deviation greater than a predetermined threshold;

the measurement and transmission circuit is suitable for switching the antenna circuit to static mode when at least two successive measurements of the impedance of the antenna circuit have a deviation smaller than a predetermined threshold;

the sensor comprises a printed circuit board forming a carrier substrate for the antenna impedance matching circuit and for the ground of the sensor, noteworthy in that that the antenna circuit comprises an antenna conductor which forms a loop on the printed circuit board and which is connected:

by one of its ends to the antenna impedance matching circuit; and by the other of its ends to the sensitivity switch mounted on the printed circuit board.

The method according to an aspect of the invention may comprise the following additional steps, alone or in combination:

when the vehicle is in driving phase, transmitting, in dynamic mode, said data frames;

between two data frames transmitted in dynamic mode: switching to static mode;

transmitting a measurement frame and performing a measurement of the impedance of the antenna circuit;

comparing each measurement of the impedance of the antenna circuit with the previous one;

when at least two successive impedance measurements have a deviation smaller than a predetermined threshold, and have this for a predetermined period of time, controlling the sensitivity switch so that it switches to static mode; or when the vehicle is in driving phase, transmitting, in dynamic mode, said data frames and performing a measurement of the impedance of the antenna circuit on each transmission of a data frame;

comparing each measurement of the impedance of the antenna circuit with the previous one;

when at least two successive impedance measurements have a deviation smaller than a predetermined threshold, and have this for a predetermined period of time, controlling the sensitivity switch so that it switches to static mode.

BRIEF DESCRIPTION OF THE DRAWINGS

Some preferred exemplary embodiments of the invention will now be described with reference to the appended drawings, in which.

DETAILED DESCRIPTION OF THE PREFERRED EMBODIMENTS

Figure 1:
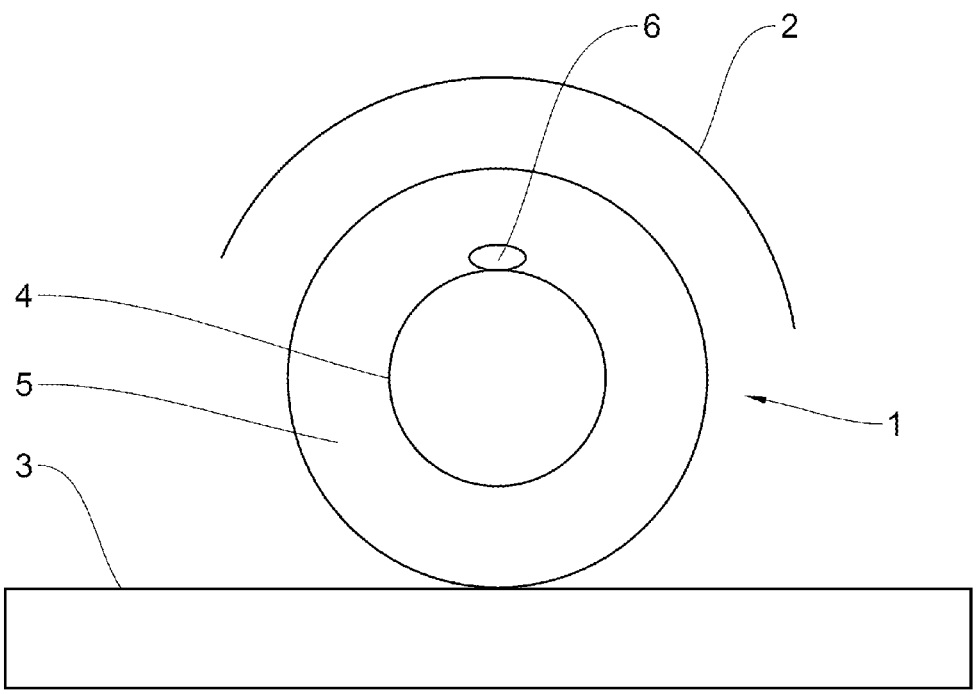
FIG. 1 schematically shows a vehicle wheel equipped with the sensor according to an aspect of the invention, and its environment.

FIG. 1 schematically shows a vehicle wheel 1 and its environment. The environment of the wheel is, in this simplified example, made up of the body 2 (of which only the wheel arch that surrounds the wheel 1 is shown) and the ground 3. This schematic view illustrates the fact that a vehicle wheel 1 is surrounded by a physical configuration of more or less conductive elements. This physical configuration is made up of numerous elements, other than those shown here, both on the vehicle and on the ground or the surroundings, these elements forming an assembly with various dielectric properties.

The vehicle wheel 1 comprises a rim 4, a tire 5, and a radio-transmitting sensor 6 mounted on the rim 4, inside the tire 5, or mounted directly in the tire 5. This sensor 6 measures the pressure, the temperature, or any other physical quantity, inside the tire 5. The sensor 6 is able to transmit a radio signal representative of this measured physical quantity. This radio signal is transmitted to a central control unit (not shown) mounted in the vehicle.

FIG. 1 also illustrates the fact that, as the wheel 1 turns, the sensor 6 moves relative to the physical configuration surrounding wheel 1. For example, as the wheel 1 rotates, the sensor 6 may approach the body 2 while moving away from the ground 3, or approach the ground 3 while moving away from the body 2. The physical configuration therefore changes around sensor 6 as the wheel 1 rotates. This change in physical configuration caused by the rotation of the wheel 1 can be detected by the sensor 6.

Figure 2:
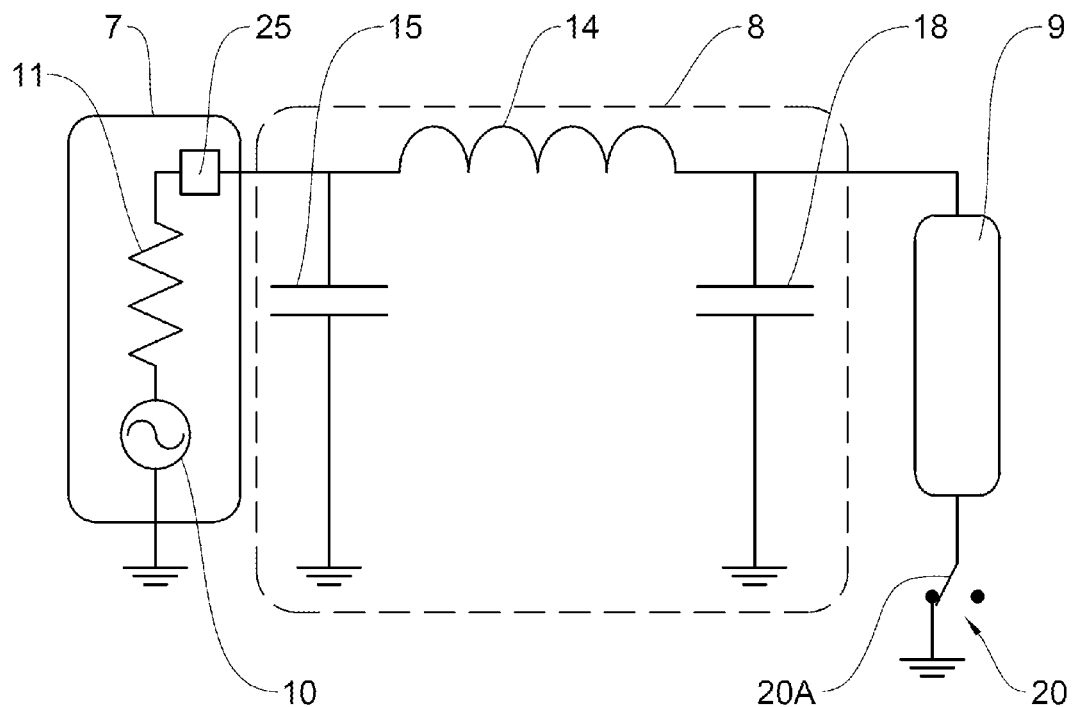
FIG. 2 is a circuit diagram of a sensor according to an aspect of the invention.

FIG. 2 is a schematic circuit diagram of the sensor 6. The sensor 6 comprises a measurement and transmission circuit 7, an antenna impedance matching circuit 8, and an antenna circuit 9.

The measurement and transmission circuit 7 comprises a power source 10 (for example an electric battery) and known means for performing the measurements (pressure sensors, temperature sensors, etc.), for processing the signal (microcontroller) and for transmitting this signal. These means constituting the measurement and transmission circuit 7 are known from the prior art and have not been shown (apart from the power source 10), and will not be described in greater detail here. A resistor 11 shown in the circuit 7 schematically represents the impedance of this circuit 7.

The antenna circuit 9 is a radio antenna, the function of which is to radiate the electromagnetic waves corresponding to the measurement signals to be transmitted by the sensor 6.

The antenna impedance matching circuit 8 is provided in order to perform impedance matching between the measurement and transmission circuit 7 and the antenna circuit 9. The matching circuit 8 is known in the field of impedance matching and may be implemented in various ways. In the present example, the matching circuit 8 consists of an inductor 14 with, in parallel, two capacitors 15, 18.

The sensor 6 further comprises a sensitivity switch 20 which, in the present example, consists of a switch 20A driven by the measurement and transmission circuit 7. The sensitivity switch 20 is arranged between the antenna circuit 9 and the ground of the sensor 6. The antenna circuit 9 may therefore be either connected to ground or isolated from ground. When the antenna circuit 9 is connected to ground, it forms a magnetic antenna, and when the antenna circuit 9 is isolated from ground, it forms an electric antenna.

The sensitivity switch 20 is driven such that the antenna circuit 9, and by extension the sensor 6, may operate according to two modes:
  what is called "dynamic" mode, in which the radio transmissions are produced by the antenna circuit 9 operating as a magnetic antenna (the switch 20A is then in its position of FIG. 2, connecting the antenna circuit 9 to ground);
  what is called "static" mode, in which the radio transmissions are produced by the antenna circuit 9 operating as an electric antenna (the switch 20A is then in its position opposite to that shown in FIG. 2, isolating the antenna circuit 9 from ground).

The antenna matching circuit 8 comprises an inductor 14 and capacitors 15, 18 which are sized in a conventional manner for an antenna matching circuit. The values of the inductor 14 and of the capacitors 15, 18 are thus chosen, in a known manner in respect of impedance matching, according to the impedance 11 of the measurement and transmission circuit 7 and that of the antenna circuit 9, so as to obtain:
  a wide bandwidth, which is conducive to the transmission of data frames;
  a low quality factor (Q factor), which allows the data transmission to have little sensitivity to external electromagnetic disturbances so as to guarantee the integrity of the transmitted data frames.

The antenna matching circuit 8 is therefore designed in accordance with the rules of the art in respect of impedance matching.

By way of example, for a transmission frequency of 2.45 GHz, the first capacitor 15 may have a value of 0.75 pF, the second capacitor 18 may have a value of 1 pF, and the inductor 14 may have a value of 2.6 nH.

In dynamic mode, the sensor 6 behaves like a conventional radio-transmitting wheel sensor, suitable for transmitting data frames. The transmissions are performed using a magnetic loop antenna, which has the advantage of having few harmonics, and of ignoring undesirable signals.

In static mode, the data transmission performance of the sensor 6 is degraded. Transmissions from the sensor 6 are then performed using an electric antenna. The sensitivity to external electromagnetic disturbances resulting from the use of the electric antenna goes hand in hand with a sensitivity to the physical configuration external to the sensor 6. The antenna circuit 9, when the sensor 6 is in static mode, therefore makes the sensor 6 sensitive to changes in the physical configuration described with reference to FIG. 1 and it can, for example, detect the rotation of the wheel 1 (which is a particular example of change in the physical configuration around the sensor 6). The purpose of using an electric antenna here is to make it possible to monitor the dielectric configuration surrounding the sensor 6.

The measurement and transmission circuit 7 further comprises an impedance measurement device 25 which makes it possible to exploit the sensitivity of the sensor 6 to the environment. Specifically, the sensitivity of the sensor 6, when it is in static mode, results in a variation in the impedance of the antenna circuit 9 when the physical configuration around the sensor 6 varies.

The impedance measurement device 25 is embodied in a conventional manner, potentially with the aid of the microcontroller of the circuit 7. It is possible for the impedance measurement to be performed during a radio transmission sequence, where the variation in the amplitude and in the phase of the signal makes it possible to calculate the impedance to be measured. The impedance measurement device 25 may also measure the reflection coefficient. The impedance measurement device 25 may, as a variant, be embodied by any sensor suitable for measuring impedance.

Figure 3:
FIG. 3 shows a physical assembly of the sensor of FIG. 2.

FIG. 3 schematically illustrates a physical assembly that may be implemented in order to produce the antenna circuit 9. A printed circuit board 30 constitutes a substrate on which all of the electronic components of the sensor 6 are mounted and connected. The printed circuit board 30 also bears the ground of the circuit. The antenna circuit 9 comprises an antenna conductor 31 forming a loop above the printed circuit board 30. The antenna conductor 31 is connected, by one of its ends 32, to the matching circuit 8 (not shown) mounted on the printed circuit board 30, and by the other of its ends 33 to the sensitivity switch 20. The sensitivity switch 20 may connect or isolate the end 33 of the antenna conductor 9 to or from the ground of the printed circuit 30.

The sensitivity switch 20 may advantageously be embodied by a switchable Schottky diode.

Figure 4:
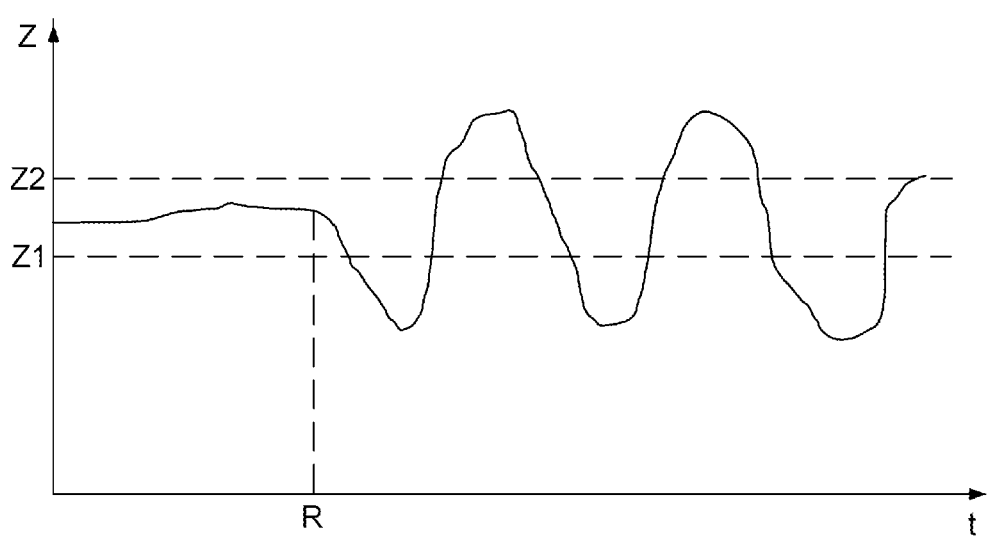
FIG. 4 is a graph illustrating the variation in the impedance of the antenna circuit of the sensor of FIG. 2 when it is in a static mode.

FIG. 4 is a graph showing the variation in the impedance Z of the antenna circuit 9 as a function of time t, when the sensor 6 is in static mode. This figure illustrates one example of change in the configuration around the sensor 6 caused by a rotation of the vehicle wheel on which the sensor 6 is mounted. Since the sensor 6 is in static mode, the antenna circuit 9 is configured as an electric antenna and the sensor 6 is therefore sensitive to these changes in physical configuration. According to this example, between the origin and time R, the wheel is stationary (it does not turn). The curve of the impedance of the antenna circuit 9 therefore remains substantially stable. From time R, the wheel is rotated, which causes a substantial variation in the curve of the impedance. These variations are cyclical, the curve passing through a maximum corresponding for example to the sensor 6 passing closest to the body 2 of the vehicle, and through a minimum corresponding for example to the sensor 6 passing closest to the ground (or vice-versa).

When, between two measurements of the impedance Z (performed by the impedance device 25), the impedance Z varies beyond a certain threshold (for example ±10%), the wheel rotation is detected. The values Z1 and Z2 shown in FIG. 4 illustrate this interval ±10% of the impedance corresponding to time R. In other words, the value Z1 is equal to the impedance at time R minus 10% and the value Z2 is equal to the impedance at time R plus 10%. The impedance values before time R are within this interval, since the wheel is immobile. Just after time R, the impedance curve exits the interval (passing below the value Z1) and the rotation of the wheel is then detected.

Figure 5:
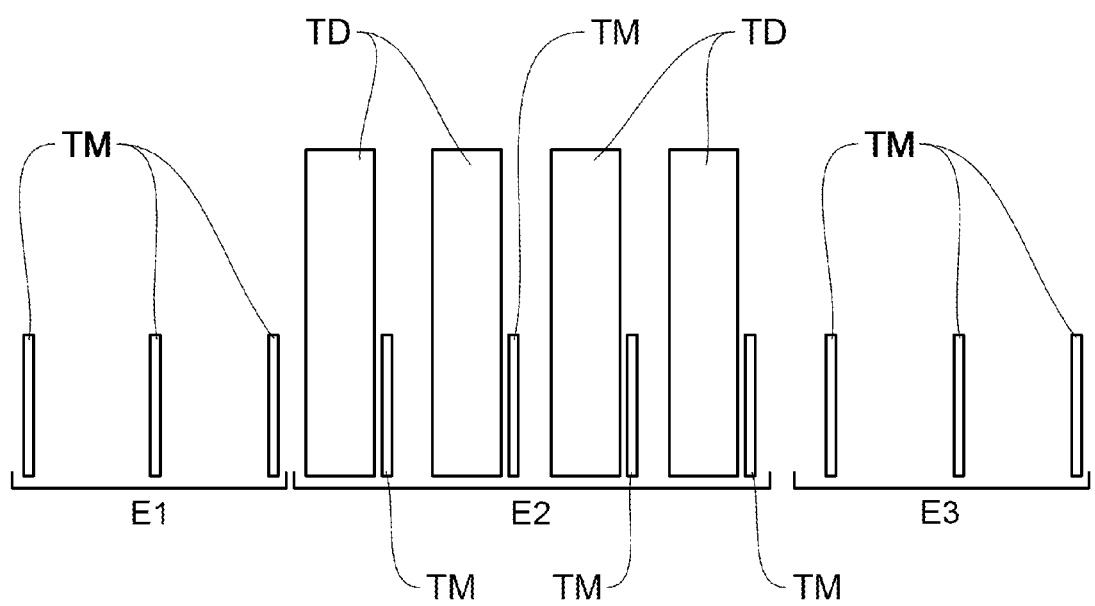
FIG. 5 shows histograms illustrating the wave frames transmitted by the sensor of FIG. 2.

FIG. 5 schematically illustrates the execution of a method for monitoring the rotation of a vehicle wheel, implementing the sensor 6. According to this example, the wheel of the vehicle is first of all stationary (parked phase E1), then starts to turn (driving phase E2), and finally becomes stationary again (parked phase E3). FIG. 5 illustrates, by means of histograms, the successive radio transmissions performed by the sensor 6 over time.

In the first phase E1, which is a parked phase, the sensor 6 is in static mode and is therefore sensitive to the dielectric parameters of its environment. In static mode, the information on pressure, temperature, or any other quantity measured by the sensor 6 is not required by the vehicle and the transmissions of data frames, such as the TPMS frames, are therefore stopped (or potentially greatly decreased), which makes it possible to save the power source 10. However, in this first phase E1, an impedance measurement frame TM will be transmitted at regular intervals, for example every 15 seconds. The purpose of this measurement frame TM is not to transmit information but only to perform an measurement of the impedance of the antenna circuit 9. The measurement frame TM may be for example a simple carrier wave of very short duration (its duration may be less than one hundredth of the duration of a conventional information transmission frame). By way of example, a conventional data frame of the TPMS protocol, for transmitting the value of the tire pressure, may last 10 milliseconds and the measurement frame TM may last less than 0.1 millisecond.

The measurement and transmission circuit 7 performs, by virtue of the impedance measurement device 25, one impedance measurement for each measurement frame TM transmitted. Each impedance measurement is compared with the preceding one in order to detect whether a change in impedance has occurred beyond a predetermined interval (e.g. ±10%, as above).

For as long as two consecutive impedance measurements do not cross such a predetermined interval, this indicates that the wheel remains immobile. When the wheel begins to turn, the change in impedance beyond the interval is detected, and the rotation of the wheel is thus detected. In FIG. 5, during the last measurement frame TM of the first phase E1, the wheel rotation is detected and the method then moves on to the second phase E2.

At the start of the second phase E2, which is a driving phase, the sensitivity switch 20 is switched so that the antenna circuit 9 switches to dynamic mode, and therefore becomes a magnetic antenna. The switch 20A is therefore activated so that the end 33 of the antenna conductor 31 is connected to ground. The measurement and transmission circuit 7 then performs, in a conventional manner, the radio transmissions required for the transmission, to the vehicle, of the values of the physical quantities measured (pressure, temperature, etc.) according to the appropriate protocols, such as the TPMS protocol. Conventional data frames TD are therefore transmitted by the sensor 6. FIG. 5 schematically shows the data frames TD which are greater in amplitude and duration than the measurement frames TM.

In addition to these conventional transmissions of data frames TD, the circuit 7 periodically performs the transmission of a measurement frame TM and the concomitant impedance measurement. For this, after the transmission of a data frame TD, the sensor 6 again switches to static mode in order to produce a measurement frame TM, then returns to dynamic mode in order to perform the transmission of the next data frame TD, and so on. The frequency of the measurement frames TM of this second phase E2 may be synchronized with the frequency of the data frames TD, one measurement frame occurring after each data frame, as shown in FIG. 5. As a variant, the measurement frames TM may be produced at the same frequency as in the first phase E1 (for example every 15 seconds) by placing each measurement frame TM between two data frames TD. FIG. 5 is not representative of the frequencies of transmission of real frames: the measurement frames TM of the first phase E1 are produced every 15 seconds (for example), and the frequency of transmission of the data frames in the second phase E2 is much lower, for example every 60 seconds.

In the second phase E2, as in the first phase E1, each impedance measurement is compared with the preceding one. As this is a driving phase, the successive measurements essentially show a variation greater than the threshold (for example ±10%, as above). When a plurality of successive measurements have a deviation smaller than the threshold, this indicates that the wheel is immobile.

To move on to the third phase E3, which is a parked phase, the sensor 6 detects that the wheel has been immobile for a duration longer than a predetermined duration, for example 5 minutes. The sensor then switches to static mode and remains in that mode throughout the third phase E3, operating as described for the first phase E1.

As a variant, in the second phase E2, the sensor 6 does not transmit a specific measurement frame TM. In this case, the measurement and transmission circuit 7 makes use of the data frames TD in order to perform the impedance measurements. On each data frame TD, the impedance measurement device performs its measurement, which is compared with the preceding one as described above. According to this variant, for each data frame TD, the sensor 6 remains in dynamic mode in order to perform the transmission of the data then, for example at the end of the frame TD, in its last moments, the sensor 6 switches to static mode and then performs the impedance measurement. The sensor 6 thus switches to static mode during the TD frame in order to perform the impedance measurements. The frame TD may also be extended by an additional duration if necessary.

Other variant embodiments of the sensor and of method may be implemented without departing from the scope of an aspect of the invention. For example, phenomena other than the rotation of the wheel may be detected as long as they involve a change in the dielectric parameters of the environment of the sensor.

Furthermore, the measurement of the impedance of the antenna circuit 9 by the impedance measurement device 25 may consist in measuring the real part and the imaginary part of this impedance. The comparison of the impedances measured for two successive measurements may be performed by comparing the two real parts and the two imaginary parts with one another. If either or both of these deviations is greater than the threshold (for example ±10%, as above), the sensor switches to dynamic mode.

In addition, the antenna impedance matching circuit 8 may be different from that described by way of example. Those skilled in the art will be able to choose components that make it possible to perform the impedance matching according to the characteristics desired for the matching circuit, described above, and relating to the static and dynamic modes, for a type of antenna used.

The sensitivity switch 20, and the switches constituting it, may be embodied by any driven switching means, such as transistors.

The antenna may take any shape suitable for a magnetic antenna, such as a rectangle, square, triangle, ellipse, or circle. The conductor constituting it may be wound in one or more turns.

The antenna circuit may further comprise two separate antennas, a magnetic antenna and an electric antenna, the sensitivity switch then being adapted to connect one or the other of these antennas to the matching circuit in order to switch to dynamic mode and to static mode, respectively.

The invention claimed is:

1. A radio-transmitting sensor for a vehicle wheel, suitable for measuring at least one physical quantity and for transmitting a radio signal representative of this measured physical quantity, the sensor comprising:
    a measurement and transmission circuit,
    an antenna impedance matching circuit, and
    an antenna circuit,
    the sensor further comprising a sensitivity switch controlled by the measurement and transmission circuit and suitable for switching the antenna circuit according to two modes:
        a dynamic mode in which the antenna circuit is configured as a magnetic antenna, and in which the sensor transmits said radio signal representative of the measured physical quantity, this signal comprising transmitted data frames; and
        a static mode in which the antenna circuit is configured as an electric antenna.

2. The sensor as claimed in claim 1, wherein the sensitivity switch is arranged between the antenna circuit and ground, the sensitivity switch being controlled such that:
    in dynamic mode, the antenna circuit is connected to ground, the antenna circuit forming a magnetic antenna;
    in static mode, the antenna circuit is isolated from ground, the antenna circuit forming an electric antenna.

3. The sensor as claimed in claim 1, wherein the measurement and transmission circuit comprises a device for measuring the impedance of the antenna circuit.

4. The sensor as claimed in claim 3, wherein, when the antenna impedance matching circuit is in static mode, the sensor transmits measurement frames and in that the device for measuring the impedance of the antenna circuit performs a measurement of the impedance of the antenna circuit on each measurement frame.

5. The sensor as claimed in claim 4, wherein the sensor transmits one measurement frame in static mode between two data frames transmitted in dynamic mode.

6. The sensor as claimed in claim 3, wherein the measurement and transmission circuit is suitable for switching the antenna circuit to dynamic mode when at least two successive measurements of the impedance of the antenna circuit have a deviation greater than a predetermined threshold.

7. The sensor as claimed in claim 3, wherein the measurement and transmission circuit is suitable for switching the antenna circuit to static mode when at least two successive measurements of the impedance of the antenna circuit have a deviation smaller than a predetermined threshold.

8. The sensor as claimed in claim 1, comprising a printed circuit board forming a carrier substrate for the antenna impedance matching circuit and for the ground of the sensor, wherein the antenna circuit comprises an antenna conductor which forms a loop on the printed circuit board and which is connected:
    by one of its ends to the antenna impedance matching circuit; and
    by the other of its ends to the sensitivity switch mounted on the printed circuit board.

9. A method for monitoring the rotation of a vehicle wheel, implementing the sensor as claimed claim 1, the method comprising:
    when the vehicle is in parked phase, transmitting, in static mode, only measurement frames and performing a measurement of the impedance of the antenna circuit on each transmission of a measurement frame;
    comparing each impedance measurement with the previous one;
    when at least two successive impedance measurements have a deviation greater than a predetermined threshold, controlling the sensitivity switch so that it switches to dynamic mode.

10. The method as claimed in claim 9, further comprising:
    when the vehicle is in driving phase, transmitting, in dynamic mode, said data frames;
    between two data frames transmitted in dynamic mode: switching to static mode; transmitting a measurement frame and performing a measurement of the impedance of the antenna circuit;
    comparing each measurement of the impedance of the antenna circuit with the previous one;
    when at least two successive impedance measurements have a deviation smaller than a predetermined threshold, and have this for a predetermined period of time, controlling the sensitivity switch so that it switches to static mode.

11. The method as claimed in claim 9, further comprising:
    when the vehicle is in driving phase, transmitting, in dynamic mode, said data frames and performing, in static mode, a measurement of the impedance of the antenna circuit on each transmission of a data frame;
    comparing each measurement of the impedance of the antenna circuit with the previous one;
    when at least two successive impedance measurements have a deviation smaller than a predetermined threshold, and have this for a predetermined period of time, controlling the sensitivity switch so that it switches to static mode.

\* \* \* \* \*